Sept. 2, 1952  W. FERRIS  2,608,934
HYDRODYNAMIC MACHINE

Filed Oct. 27, 1945  3 Sheets-Sheet 1

INVENTOR.
WALTER FERRIS
BY
Wesley P Merrill

Sept. 2, 1952 — W. FERRIS — 2,608,934
HYDRODYNAMIC MACHINE
Filed Oct. 27, 1945 — 3 Sheets-Sheet 2

INVENTOR.
WALTER FERRIS

Sept. 2, 1952      W. FERRIS      2,608,934
HYDRODYNAMIC MACHINE

Filed Oct. 27, 1945      3 Sheets-Sheet 3

INVENTOR.
WALTER FERRIS

Patented Sept. 2, 1952

2,608,934

UNITED STATES PATENT OFFICE 2,608,934

HYDRODYNAMIC MACHINE

Walter Ferris, Milwaukee, Wis., assignor to The Oilgear Company, Milwaukee, Wis., a corporation of Wisconsin Application October 27, 1945, Serial No. 625,027

11 Claims. (Cl. 103—161)

1

This application is a continuation-in-part of application Serial No. 618,288, filed September 24, 1945.

The invention relates to hydrodynamic machines of the type having cylinders arranged in a rotatable cylinder barrel, pistons fitted in the cylinders with their outer ends in engagement with a thrust member which is eccentric to the cylinder barrel and causes the pistons to reciprocate in their cylinders during rotation of the cylinder barrel, and a valve for controlling the flow of liquid to and from the cylinders.

More particularly, the invention relates to a hydrodynamic machine of the rolling piston type. That is, a machine having an annular reaction surface arranged upon its thrust member and engaging the outer end of each piston upon a single spot which is offset far enough from the piston axis to cause the piston to rotate in its cylinder as it reciprocates therein, such as the hydrodynamic machine described and claimed in Patent No. 2,074,068.

In the machine shown in the above patent, the cylinder barrel rotates upon a shaft or pintle which constitutes the valve for controlling the flow of liquid to and from the cylinders but machines of the rolling piston type are also made with flat valves on one or both ends of the cylinder barrel to control the flow of liquid to and from the cylinders, such as the machine shown in Patent No. 2,273,468, and the present invention is particularly applicable to a rolling piston machine of the flat valve type.

A machine of the rolling piston type will function as a pump when it is driven mechanically and it will function as a hydraulic motor when it is supplied with liquid under pressure. Since the function of a pump and the function of a motor are substantially opposite to each other, a machine embodying the invention will be explained and referred to herein as a pump but it is to be understood that the invention is equally applicable to a motor and is in no way limited to a pump.

When a rolling piston pump is in operation, each piston moves outward and its cylinder is supplied with liquid during one half of each revolution of the cylinder barrel, and the thrust member forces the piston inward and causes it to expel liquid from its cylinder during the other half of each revolution of the cylinder barrel.

Due to the reaction surface engaging each piston upon a single spot, the pumping force transmitted through the piston is limited by the bearing value of that spot. If the pump is designed to create pressures below a moderate value such as 1200 pounds per square inch, each piston may be headless and of such diameter that the contact spot may be located far enough from the piston axis to cause the piston to rotate as it reciprocates. If the pump is designed to create pressures up to a high value such as 3500 p. s. i., the pistons must be reduced in diameter accordingly in order to keep the maximum pumping force within the bearing value of the contact spot and each piston must be provided with an enlarged head, as shown in Patent No. 2,074,068, in order that the contact spot may be located far enough from the piston axis to cause the piston to rotate as it reciprocates.

Rolling piston pumps with large heads operate successfully in pumps designed to carry pressures up to the maximum ordinarily required but in a pump designed to create very high pressures, such as 6000 p. s. i. each piston would necessarily be so small in diameter that the distance between its axis and the contact spot would be so great relative to the radius of the pistons that there would be grave danger of the head breaking off when the pump was required to create a very high pressure.

The present invention has as an object to provide a rolling piston pump which can create high pressures without danger of breaking its pistons.

Another object is to employ leakage liquid for holding the pistons against the thrust member.

A pump constructed according to the invention has the advantage that its pistons are so well guided that the danger of the transverse components of the pumping forces causing the outer ends of the cylinder bores to wear out of round is substantially eliminated.

These and other objects and advantages will be apparent from the description hereinafter given of a pump in which the invention is embodied.

According to the invention in its general aspect, a rotatable cylinder barrel is provided with a plurality of cylinders each of which includes a pumping portion and a non-pumping portion of different diameters with the smaller portion inward from and communicating with the larger portion, a piston is fitted in each cylinder and includes two portions of different diameters fitted respectively in the two portions of the cylinder, a thrust member engages the outer ends of the pistons and causes each piston to move inward and outward alternately as the cylinder barrel rotates, the pumping portions of the cylinders are connected through a valve to an external circuit, the non-pumping portions of the cylinders are connected to each other, the inward moving pistons eject liquid from the pumping portions of their cylinders to an external circuit and from the non-pumping portions of their cylinders to the non-pumping portions of the cylinders which contain outward moving pistons. The smaller inner portions of the cylinders may be the pumping portions and the larger outer portions may be connected to each other as shown in the drawings, or the larger outer portions of the cylinders may be the pumping portions and the smaller inner portions be connected to each other as shown and specifically claimed in application Serial No. 618,288.

The invention is exemplified by the pump shown somewhat diagrammatically in the accompanying drawings in which the views are as follows.

Figure 1:
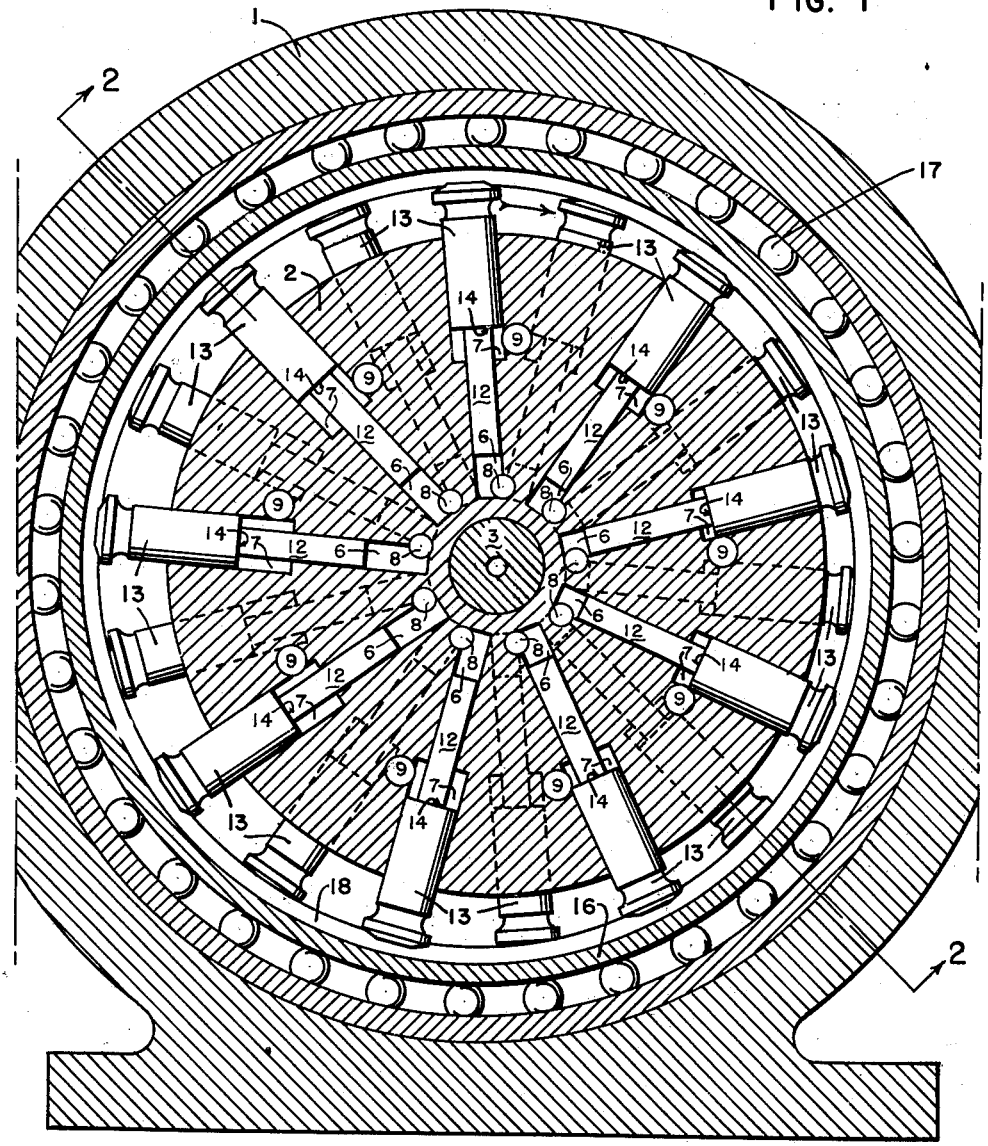
Fig. 1 is a transverse vertical section through a pump in which the invention is embodied, the plane of the view being indicated by the line 1—1 of Fig. 2.
Figure 2:
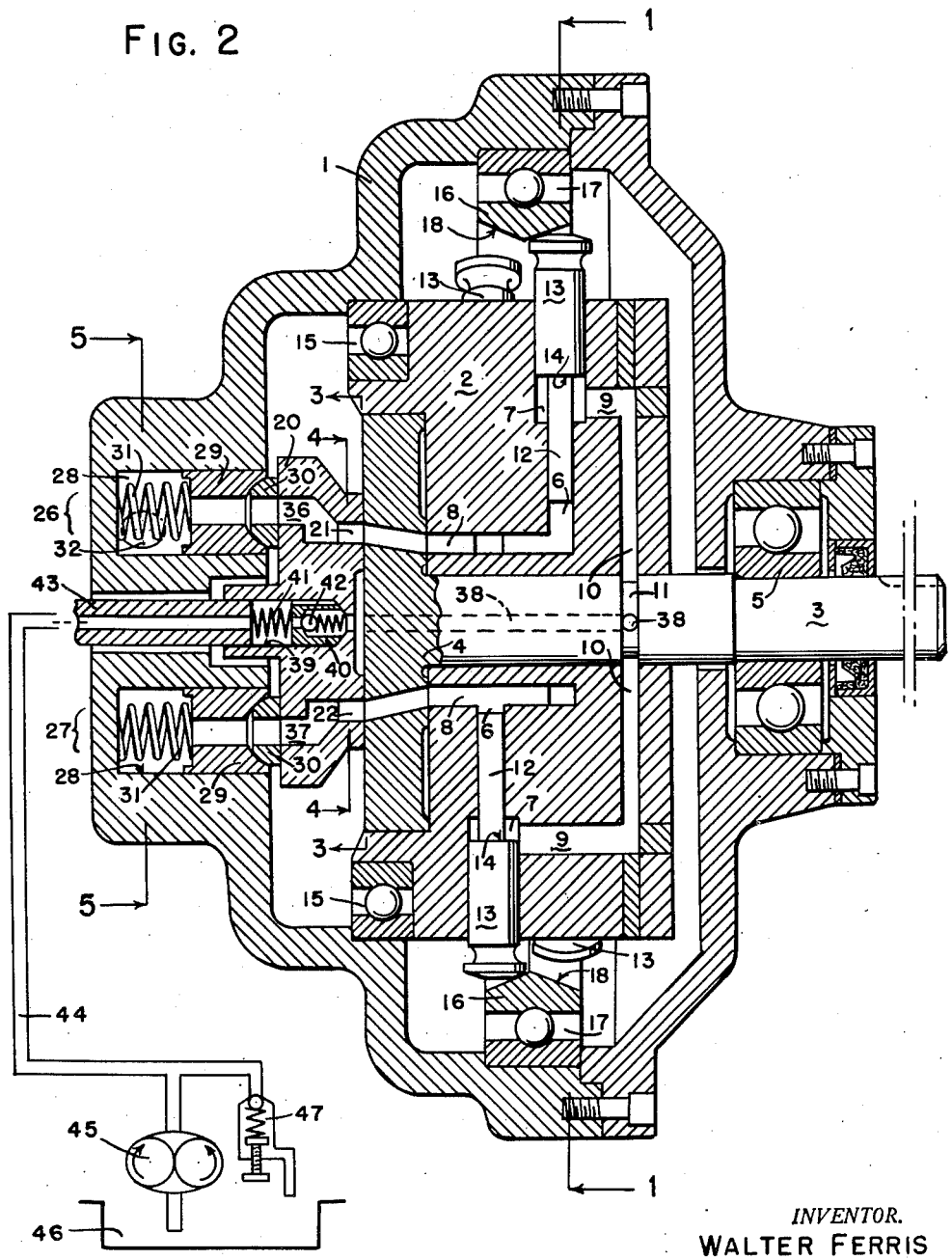
Fig. 2 is a central longitudinal section through the pump taken on the line 2—2 of Fig. 1, the view being inclined to the vertical center line in order to show the hold-up motors for the valve.
Figure 3:
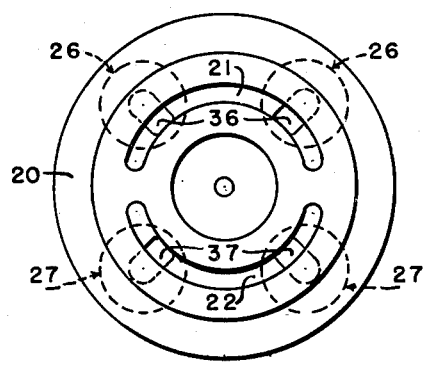
Fig. 3 is a vertical elevation of the valve which controls the flow of liquid to and from the cylinders, the plane of the view being indicated by the line 3—3 of Fig. 2.
Figure 4:
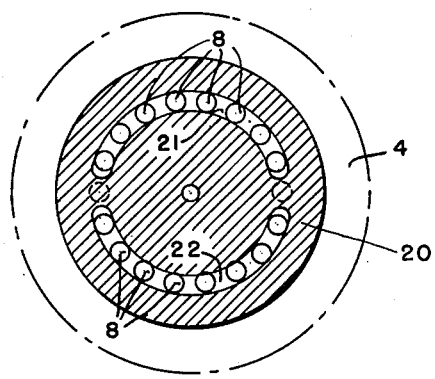
Fig. 4 is a vertical section through the valve taken in the plane indicated by the line 4—4 of Fig. 2.

For the purpose of illustration, the invention has been shown embodied in a radial pump of the flat valve type but it may be embodied in other types of hydrodynamic machines.

The pump chosen for illustration has its mechanism arranged within and carried by a casing 1 of suitable construction. Casing 1 encloses a rotatable cylinder barrel 2 which is fixed to a shaft 3 in any suitable manner such as by shaft 3 having a flange 4 fixed to or formed integral therewith and rigidly secured to cylinder barrel 2 as by being bolted thereto. Shaft 3 extends outward through casing 1 for connection to a source of power and is journaled in a thrust bearing 5 carried by casing 1. Cylinder barrel 2 is provided with a plurality of radial cylinders each of which consists of a small diameter inner bore 6 and an outer concentric bore 7 of larger diameter. The cylinders have been shown arranged in two circular rows with the largest odd number of cylinders in each row that is practical but the pump may have only a single row or a larger number of rows of cylinders depending upon the volumetric capacity desired.

The cylinders in one row are offset one half of the cylinder spacing from the cylinders in the other row and the inner end of each bore 6 in the front row communicates with a passage 8 which also communicates with the inner end of the adjacent bore 6 in the rear row and extends rearward through cylinder barrel 2 and flange 4.

Likewise, each bore 7 in one row communicates at its inner end with a passage 9 which is formed axially in cylinder barrel 2 and also communicates with the inner end of the adjacent bore 7 in the other row. Each passage 9 communicates with a passage 10 which extends radially inward into communication with an annular groove 11 which is formed in shaft 3.

Each cylinder 6—7 has a piston fitted therein. Each piston includes a small diameter portion or pumping piston 12, which is closely fitted in the bore 6 of that cylinder, and a larger concentric guiding portion 13 which is closely fitted in the bore 7 of that cylinder and forms an annular shoulder 14 at its junction with the small portion 12. During rotation of cylinder barrel 2, pistons 12—13 will reciprocate in cylinders 6—7, liquid will flow through passages 8 to and from bores 6 and liquid will flow through passages 9 and 10 to and from bores 7 as will presently be explained.

Cylinder barrel 2 is adapted to be rotated from an external source of power by shaft 3 and it is supported for rotation by bearing 5 and by a ball bearing 15 the outer race of which is fixed in casing 1. In order to keep the overall length of the pump at a minimum, flange 4 is arranged within a suitable recess formed in the rear end of cylinder barrel 2 and bearing 15 is arranged radially outward from flange 4.

During rotation of cylinder barrel 2, pistons 12—13 are reciprocated in their cylinders by an annular thrust member 16 which is eccentric to cylinder barrel 2. For the purpose of illustration, thrust member 16 has been shown as being rotatably supported within a ball bearing 17 which has its outer race fixed in a stationary position within casing 1 but the thrust member may be rotatably supported within a displacement varying member or slide block which is shiftable transversely of the cylinder barrel axis to vary the displacement of the pump according to common practice and as shown in the patents referred to above.

Thrust member 16 has two beveled reaction surfaces 18 formed upon the inside thereof at acute angles to the respective piston axes and each surface engages the outer ends of the pistons in one of the circular rows. The outer end of each piston 12—13 is so shaped and of such a size that it engages a reaction surface upon a single spot which is offset far enough from the piston axis to cause the piston to rotate in its cylinder as it reciprocates therein as explained in Patent No. 2,074,068.

For the purpose of illustration, pistons 12—13 have been shown as having enlarged heads upon their outer ends in order that the contact spot may be located far enough from the piston axis to cause the pistons to rotate, reaction surfaces 18 have been shown inclined in opposite directions relative to the cylinder barrel axis, and pistons 12—13 have been shown arranged upon radii of the cylinder barrel. However, the outer portions 13 of the pistons may be made large enough in diameter to avoid the necessity of providing enlarged heads, reaction surfaces 18 may be inclined in the same direction, or the reaction surfaces may be parallel to the cylinder barrel axis and the pistons inclined to the radii of the cylinder barrel as shown in Patent No. 2,273,468, the term "radial" as used herein being intended to apply to a piston which extends through the outer periphery of a cylinder barrel inward toward the axis thereof regardless of whether the piston is upon or inclined to a radius of the cylinder barrel.

Due to thrust member 16 being eccentric to cylinder barrel 2, each piston 12—13 will move progressively outward during one half of each revolution of cylinder barrel 2 and it will be forced progressively inward during the other half of each revolution of cylinder barrel 2. Liquid will flow into the bores 6 and 7 in which the outward moving pistons are fitted and the inward moving pistons will eject liquid from the bores 6 and 7 in which they are fitted.

The flow of liquid to and from bores 6 is controlled by a flat valve 20 which engages the outer face of flange 4 and is provided in its face with two diametrically opposed arcuate ports 21 and 22 with which passages 8 register successively as cylinder barrel 2 rotates. The outer face of flange 4 constitutes a seat for valve 20 but, if shaft 3 were attached to cylinder barrel 2 in a different manner, valve 20 would engage a valve seat formed upon or attached to the end of cylinder barrel 2.

Valve 20 has been shown as being urged against flange 4 by two hydraulic hold-up motors 26 and two hydraulic hold-up motors 27 but it may be urged against flange 4 by only two hold-up motors, as shown in application Serial No. 618,288 or by a plurality of hold-up motors and auxiliary hold-up and balancing motors as shown in Patent No. 2,484,337.

Hold-up motors 26 and 27 are identical and each has a cylinder 28 formed in casing 1, a hollow piston 29 fitted in cylinder 28, an annular sealing member 30 arranged between piston 29 and valve 20 with its opening substantially in alignment with the opening through piston 29, and a spring 31 for initially urging piston 29 against sealing member 30 and member 30 against valve 20. The abutting surfaces on member 30 and valve 20 are ordinarily ground flat and smooth and the abutting surfaces on member 30 and piston 29 are ordinarily ground spherical and smooth so that member 30 may provide a substantially liquid tight joint between piston 29 and valve 20 irrespective of slight errors in alinement or deflections of the parts under pressure.

Figure 5:
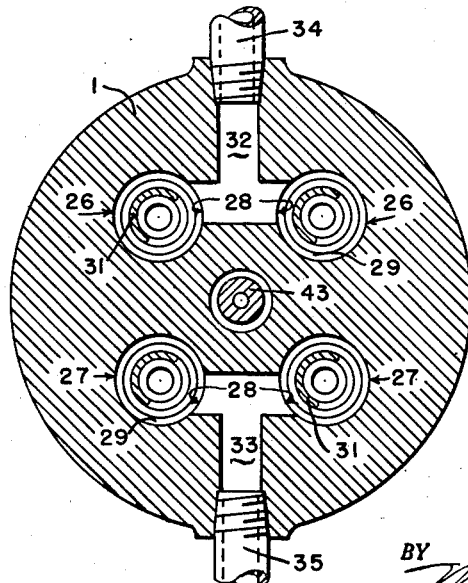
Fig. 5 is a vertical section taken in the plane indicated by the line 5—5 of Fig. 2.

As shown in Fig. 5, the cylinders 28 of both hold-up motors 26 communicate with a passage 32 and the cylinders 28 of both hold-up motors 27 communicate with a passage 33 which are formed in casing 1 and adapted to be connected to opposite sides of the hydraulic circuit as indicated by the two pipes 34 and 35.

The aligned openings through the piston 29 and sealing member 30 of each hold-up motor 26 register with a passage 36 which extends through the rear end of valve 20 into communication with port 21, and the aligned openings through the piston 29 and member 30 of each hold-up motor 27 register with a passage 37 which extends through the rear end of valve 20 into communication with port 22. The arrangement is such that liquid may flow freely between port 21 and pipe 34 and between port 22 and pipe 35. Any pressure prevailing in port 21 acts upon the pistons 29 of both hold-up motors 26 and any pressure prevailing in port 22 acts upon the pistons 29 of both hold-up motors 27 and causes valve 20 to be urged against its seat by a force which is proportional to pump pressure. Valve 20 is thus held against its seat by a hold-up force consisting of two factors, one of which is supplied by springs 31 and is constant and the other of which is supplied by the motive liquid and varies in accordance with variations in pump pressure.

In the pump shown, the hold-up force tends to move cylinder barrel 2 axially toward the right but is prevented from doing so by thrust bearing 5. While this arrangement is satisfactory in small pumps, reaction surfaces 18 may be inclined in the same direction, as shown in Patent No. 2,273,468, so that the axial components of the pumping forces are opposite in direction to the hold-up forces and thereby relieve the axial load on bearing 5.

In a pump of considerably larger capacity, one half of the bores 6 communicate with passages 8 which extend through the left end of the cylinder barrel and are controlled by a valve, such as valve 20, and the other half of the bores 6 communicate with similar passages extending through the right end of the cylinder barrel and are controlled by a valve which is arranged thereon and is similar to valve 20 except that it has a central opening through which the drive shaft extends as shown in Patent No. 2,484,337. The hold-up forces are thus opposed and the cylinder barrel is hydrostatically balanced axially.

When cylinder barrel 2 is rotated in a clockwise direction in respect to Fig. 1, thrust member 16 will force the pistons 12—13 in contact with the upper half thereof progressively inward and the pistons 12—13 in contact with the lower half of thrust member 16 will move progressively outward due to thrust member 16 being eccentric to cylinder barrel 2.

The bores 6 of the cylinders containing the outward moving pistons will be filled with liquid which flows thereto through passages 8, valve port 22, passages 37, hold-up motors 27 and passage 33 from pipe 35. The inward moving pistons 12—13 will eject liquid from the bores 6 of their cylinders through passages 8, valve port 21, passages 36, hold-up motors 26 and passage 32 into pipe 34 and will eject liquid from bores 7 of their cylinders through passages 9 and 10 and groove 11 to the bores 7 of the cylinders containing the outward moving pistons.

The volume of liquid ejected from the bores 7 by the inward moving pistons is exactly equal to the volume required to fill the bores 7 of the cylinders containing the outward moving pistons. However, when the pump is creating a high pressure, there will be a slight leakage of liquid from the bores 6 to the bores 7 of each cylinder containing an inward moving piston so that the liquid flowing into groove 11 is in excess of the volume required to fill the bores of the cylinders containing the outward moving pistons. In order to provide for the escape of this excess liquid, a duct 38 extends radially inward from groove 11 and then extends rearward axially through shaft 3 and flange 4.

Thrust member 16 engages the head of each piston 12—13 upon a single spot which is offset far enough from the piston axis to cause the piston to rotate in its cylinder as it reciprocates therein, and the force which can be transmitted from the thrust member to the liquid in the cylinder is limited by the bearing value of that spot. However, the force which must be transmitted through a piston to create a given pressure is proportional to the effective pumping area of the piston multiplied by the pressure and, since the area of piston portion 12 is small, a very high pressure can be created without exerting upon each piston a load in excess of the bearing value of the contact spot.

Since each piston engages an inclined reaction surface 18 upon a spot which is offset from the piston axis, the pumping force is applied to the piston at a right angle to the inclined reaction surface. The pumping force is opposed by the resistance of the liquid against the end of portion 12 which causes the pumping force to be resolved into a radial component which forces the piston inward and a lateral component which causes the piston to bear against one side of the cylinder. However, guiding portions 13 are relatively large so that the bearing surface of each piston is much greater than on the conventional rolling piston, and the tendency of the cylinder to wear out of round is thus negligible.

When outward movements of the pistons of a radial pump are dependent solely upon centrifugal force, a piston sometimes will not move progressively outward as the cylinder barrel rotates but it will hesitate until its outer end is a substantial distance from the reaction surface and then it will move outward suddenly and strike the reaction surface with considerable force, thereby creating objectionable noise and tending to deform the end of the piston and/or the reaction surface. Such a condition frequently results when the motive liquid is overheated and hence generates gas bubbles, or when air is entrained in the motive liquid.

This objectionable feature may be avoided by subjecting shoulders 14 or the inner ends of portions 12 or both to fluid pressure which will hold the outer ends of the pistons positively in contact with the thrust member. Shoulders 14 may be subjected to pressure by providing a resistance valve to resist the discharge of leakage liquid from passage 38. The pistons may be initially urged against the thrust member by supercharging the pump if it is small or if it is connected into a closed circuit but, if the pump is large and is connected into an open circuit, supercharging is not practical.

For the purpose of illustration, the pump has been shown as having a foot valve arranged in a bore 39 which extends through valve 20 into communication with passage 38 and has a suitable valve seat at its inner end. The foot valve includes a resistance valve 40 which is urged against the valve seat by a spring 41 and has an axial passage extending therethrough, and a check valve 42 which controls the passage through valve 40 and opens in a direction opposite to that in which valve 40 opens.

The arrangement is such that check valve 42 will permit liquid to flow substantially freely from bore 39 to passage 38 but will prevent liquid from flowing from passage 38 into bore 39 without raising valve 40 against the resistance of spring 41 which has sufficient strength to hold valve 40 to its seat until the pressure in passage 38 reaches a predetermined maximum, such as 100 p. s. i. The pressure in passage 38 also acts upon the front end of valve 20 and increases the blow-off force tending to move valve 20 away from its seat but this increase in blow-off force may be compensated for by correspondingly increasing the tension of springs 31.

In order that pistons 12—13 may be initially moved into contact with thrust member 16 independently of centrifugal force, the rear end of bore 39 may communicate with a tube 43 which is fixed to valve 20 and extends through the rear wall of casing 1 with sufficient clearance to permit valve 20 to bear uniformly upon its seat. Tube 43 may be connected by a channel 44 to the outlet of an auxiliary pump 45 which draws liquid from a reservoir 46 and discharges the liquid delivered by it in excess of requirements through a low pressure relief valve 47.

Auxiliary pump 45 has been shown as being separate from the main pump but it may be arranged within casing 1 and driven in unison with cylinder barrel 2 according to common practice. Also, auxiliary pump 45 may be employed to supercharge the main pump and to supply liquid for control purposes according to common practice.

When the pump is started, liquid from auxiliary pump 45 will flow through channel 44, tube 43 and bore 39 past check valve 42 and through channel 38, groove 11 and passages 10 and 9 into bores 7 and exert sufficient force upon shoulders 14 to force pistons 12—13 against thrust member 16.

As previously explained, rotation of cylinder barrel 2 causes the pistons 12—13 on the discharge side of the pump to be forced progressively inward and to eject liquid from the bores 6 and 7 in which they are fitted. The liquid ejected from bores 6 flows to the external circuit while the liquid ejected from bores 7 flows to the bores 7 on the intake side of the pump and causes the pistons therein to move outward.

When the liquid discharged into the external circuit meets resistance, pressure rises and causes a slight leakage of liquid from the bores 6 into the bores 7 on the discharge side of the pump. Since the volume of liquid expelled from the bores 7 by the inward moving pistons is equal to the volume required to fill the bores 7 in which the pistons are moving outward, bores 7 are at all times filled with liquid so that the liquid leaking from the bores 6 into the bores 7 must escape therefrom through duct 38, resistance valve 40, bore 39, tube 43, channel 44 and relief valve 47 into reservoir 46. The resistance of valves 40 and 47 causes the creation of a pressure which acts upon shoulders 14 and holds pistons 12—13 against thrust member 16 with a force proportional to the pressure required to open valves 40 and 47.

The pump disclosed herein is thus capable of developing very high pressures and its pistons are at all times positively held in engagement with the thrust member.

The invention herein set forth is susceptible of various modifications and adaptations without departing from the scope thereof which is hereby claimed as follows:

1. In a hydrodynamic machine, the combination of a rotatable cylinder barrel having a plurality of two-diameter cylinders, each of said cylinders including a pumping portion and a concentric guiding portion one of which is larger than the other and is arranged outward therefrom, channels communicating with said pumping portions, valve means associated with said channels for controlling the flow of liquid to and from said pumping portions, a two-diameter piston arranged in each of said cylinders and having its larger portion fitted in the larger portion thereof and its smaller portion fitted in the smaller portion thereof, a thrust member engaging the outer ends of said pistons and so arranged in respect to said cylinder barrel as to cause the pistons on one side of said machine to move progressively inward during rotation of said cylinder barrel and to eject liquid from both the pumping portions and the guiding portions of the cylinders on that side of said machine, channel means for interconnecting the guiding portions of all of said cylinders to enable liquid ejected by inward moving pistons from the guiding portions of the cylinders on said one side of said machine to flow to the guiding portions of the cylinders on the other side of said machine and move outward the pistons in those cylinders, and means for permitting escape from said guiding portions of liquid leaking thereinto from said pumping portions including a resistance valve to resist said escape of liquid and thereby maintain in said guiding portions a fluid pressure which holds the pistons on said other side of said machine in contact with said thrust member.

2. In a hydrodynamic machine, the combination of a rotatable cylinder barrel having a plurality of two-diameter cylinders, each of said cylinders including a pumping portion and a concentric guiding portion one of which is larger than the other and is arranged outward therefrom, channels communicating with said pumping portions, valve means associated with said channels for controlling the flow of liquid to and from said pumping portions, a two-diameter piston arranged in each of said cylinders and having its larger portion fitted in the larger portion thereof and its smaller portion fitted in the smaller portion thereof, a thrust member engaging the outer ends of said pistons and so arranged in respect to said cylinder barrel as to cause the pistons on one side of said machine to move progressively inward during rotation of said cylinder barrel and to eject liquid from both the pumping portions and the guiding portions of the cylinders on that side of said machine, channel means for interconnecting the guiding portions of all of said cylinders to enable liquid ejected by inward moving pistons from the guiding portions of the cylinders on said one side of said machine to flow to the guiding portions of the cylinders on the other side of said machine and move outward the pistons in those cylinders, a source of pressure liquid other than said cylinders, and means for supplying liquid from said source to the guiding portions of said cylinders to initially move said pistons outward into contact with said thrust member.

3. In a hydrodynamic machine, the combination of a rotatable cylinder barrel having a plurality of two-diameter cylinders, each of said cylinders including a pumping portion and a concentric guiding portion one of which is larger than the other and is arranged outward therefrom, channels communicating with said pumping portions, valve means associated with said channels for controlling the flow of liquid to and from said pumping portions, a two-diameter piston arranged in each of said cylinders and having its larger portion fitted in the larger portion thereof and its smaller portion fitted in the smaller portion thereof, a thrust member engaging the outer ends of said pistons and so arranged in respect to said cylinder barrel as to cause the pistons on one side of said machine to move progressively inward during rotation of said cylinder barrel and to eject liquid from both the pumping portions and the guiding portions of the cylinders on that side of said machine, channel means for interconnecting the guiding portions of all of said cylinders to enable liquid ejected by inward moving pistons from the guiding portions of the cylinders on said one side of said machine to flow to the guiding portions of the cylinders on the other side of said machine and move outward the pistons in those cylinders, means for permitting escape from said guiding portions of liquid leaking thereinto from said pumping portions including a resistance valve to resist said escape of liquid and thereby maintain in said guiding portions a fluid pressure which holds the pistons on said other side of said machine in contact with said thrust member, a source of pressure liquid other than said cylinders, and means for supplying liquid from said source to the guiding portions of said cylinders to initially move said pistons outward into contact with said thrust member.

4. In a hydrodynamic machine, the combination of a rotatable cylinder barrel having a plurality of two-diameter cylinders each of which includes an outer guiding portion and a concentric inner pumping portion of smaller diameter, channels communicating with said pumping portions, valve means associated with said channels for controlling the flow of liquid to and from said pumping portions, a two-diameter piston arranged in each of said cylinders and having its larger portion fitted in the guiding portion thereof and its smaller portion fitted in the pumping portion thereof, a thrust member engaging the outer ends of said pistons and so arranged in respect to said cylinder barrel as to cause the pistons on one side of said machine to move progressively inward during rotation of said cylinder barrel and to eject liquid from both the pumping portions and the guiding portions of the cylinders on that side of said machine, channel means for interconnecting the guiding portions of all of said cylinders to enable liquid ejected by inward moving pistons from the guiding portions of the cylinders on said one side of said machine to flow to the guiding portions of the cylinders on the other side of said machine and move outward the pistons in those cylinders, and means for permitting escape from said guiding portions of liquid leaking thereinto from said pumping portions including a resistance valve to resist said escape of liquid and thereby maintain in said guiding portions a fluid pressure which holds the pistons on said other side of said machine in contact with said thrust member.

5. In a hydrodynamic machine, the combination of a rotatable cylinder barrel having a plurality of two-diameter cylinders each of which includes an outer guiding portion and a concentric inner pumping portion of smaller diameter, channels communicating with said pumping portions, valve means associated with said channels for controlling the flow of liquid to and from said pumping portions, a two-diameter piston arranged in each of said cylinders and having its larger portion fitted in the guiding portion thereof and its smaller portion fitted in the pumping portion thereof, a thrust member engaging the outer ends of said pistons and so arranged in respect to said cylinder barrel as to cause the pistons on one side of said machine to move progressively inward during rotation of said cylinder barrel and to eject liquid from both the pumping portions and the guiding portions of the cylinders on that side of said machine, channel means for interconnecting the guiding portions of all of said cylinders to enable liquid ejected by inward moving pistons from the guiding portions of the cylinders on said one side of said machine to flow to the guiding portions of the cylinders on the other side of said machine and move outward the pistons in those cylinders, means for permitting escape from said guiding portions of liquid leaking thereinto from said pumping portions including a resistance valve to resist said escape of liquid and thereby maintain in said guiding portions a fluid pressure which holds the pistons on said other side of said machine in contact with said thrust member, a source of pressure liquid other than said cylinders, and means for supplying liquid from said source to the guiding portions of said cylinders to initially move said pistons outward into contact with said thrust member.

6. In a hydrodynamic machine, the combination of a rotatable cylinder barrel having a plurality of two-diameter cylinders arranged therein in a circular row, each cylinder including an outer bore and a smaller inner bore, a two-diameter piston arranged in each cylinder and having its larger portion fitted in said outer bore and its smaller portion fitted in said inner bore and forming a shoulder at its junction with said large portion, an annular thrust member arranged eccentric to said cylinder barrel and engaging the outer end of each piston to cause said piston to reciprocate in its cylinder during rotation of said cylinder barrel, a channel communicating with each of said inner bores, valve means for controlling said channels to thereby control the flow of fluid to and from said cylinders, channel means for connecting said outer bores to each other to enable fluid expelled from the outer bores on one side of the machine by inward moving pistons to flow to the outer bores on the other side of the machine and move outward the pistons therein, and means for permitting the escape from said channel means of fluid leaking from said inner bores into said outer bores including a resistance valve to resist said escape of fluid and thereby create a fluid pressure which acts upon said shoulders and holds said pistons in contact with said thrust member.

7. In a hydrodynamic machine, the combination of a rotatable cylinder barrel having a plurality of two-diameter cylinders arranged therein in a circular row, each cylinder including an outer bore and a smaller inner bore, a two-diameter piston arranged in each cylinder and having its larger portion fitted in said outer bore and its smaller portion fitted in said inner bore and forming a shoulder at its junction with said large portion, an annular thrust member arranged eccentric to said cylinder barrel and engaging the outer end of each piston to cause said piston to reciprocate in its cylinder during rotation of said cylinder barrel, a channel communicating with each of said inner bores, valve means for controlling said channels to thereby control the flow of fluid to and from said cylinders, channel means for connecting said outer bores to each other to enable fluid expelled from the outer bores on one side of the machine by inward moving pistons to flow to the outer bores on the other side of the machine and move outward the pistons therein, a source of pressure fluid other than said cylinders, and means including said channel means for supplying to said outer bores from said source fluid which acts upon said shoulders to initially move said pistons outward into contact with said thrust member.

8. In a hydrodynamic machine, the combination of a rotatable cylinder barrel having a plurality of two-diameter cylinders arranged therein in a circular row, each cylinder including an outer bore and a smaller inner bore, a two-diameter piston arranged in each cylinder and having its larger portion fitted in said outer bore and its smaller portion fitted in said inner bore and forming a shoulder at its junction with said large portion, an annular thrust member arranged eccentric to said cylinder barrel and engaging the outer end of each piston to cause said piston to reciprocate in its cylinder during rotation of said cylinder barrel, a channel communicating with each of said inner bores, valve means for controlling said channels to thereby control the flow of fluid to and from said cylinders, channel means for connecting said outer bores to each other to enable fluid expelled from the outer bores on one side of the machine by inward moving pistons to flow to the outer bores on the other side of the machine and move outward the pistons therein, a source of pressure fluid other than said cylinders, means including said channel means for supplying to said outer bores fluid which acts upon said shoulders to initially move said pistons outward into contact with said thrust member, and means for permitting the escape from said channel means of fluid leaking from said inner bores into said outer bores including a resistance valve to resist said escape of fluid and thereby create in said outer bores a fluid pressure which acts upon said shoulders and holds said pistons in contact with said thrust member.

9. In a hydrodynamic machine, the combination of a rotatable cylinder barrel having a plurality of two-diameter cylinders, each of said cylinders including a pumping portion and a concentric guiding portion one of which is larger than the other and is arranged outward therefrom, channels communicating with said pumping portions, valve means associated with said channels for controlling the flow of liquid to and from said pumping portions, a two-diameter piston arranged in each of said cylinders and having its larger portion fitted in the larger portion thereof and its smaller portion fitted in the smaller portion thereof, a thrust member engaging the outer ends of said pistons and so arranged in respect to said cylinder barrel as to cause the pistons on one side of said machine to move progressively inward during rotation of said cylinder barrel and to eject liquid from both the pumping portions and the guiding portions of the cylinders on that side of said machine, channel means for interconnecting the guiding portions of all of said cylinders to enable liquid ejected by inward moving pistons from the guiding portions of the cylinders on said one side of said machine to flow to the guiding portions of the cylinders on the other side of said machine and move outward the pistons in those cylinders, a source of pressure liquid other than said cylinders, and means for supplying liquid from said source to the guiding portions of said cylinders to initially move said pistons outward into contact with said thrust member, said last named means including a check valve and a resistance valve which open in opposite directions and permit liquid to flow freely from said source to said guiding portions and permit liquid to escape from said guiding portions only after the pressure therein exceeds the pressure at said source.

10. In a hydrodynamic machine, the combination of a rotatable cylinder barrel having a plurality of two-diameter cylinders each of which includes an outer guiding portion and a concentric inner pumping portion of smaller diameter, channels communicating with said pumping portions, valve means associated with said channels for controlling the flow of liquid to and from said pumping portions, a two-diameter piston arranged in each of said cylinders and having its larger portion fitted in the guiding portion thereof and its smaller portion fitted in the pumping portion thereof, a thrust member engaging the outer ends of said pistons and so arranged in respect to said cylinder barrel as to cause the pistons on one side of said machine to move progressively inward during rotation of said cylinder barrel and to eject liquid from both the pumping portions and the guiding portions of the cylinders on that side of said machine, channel means for interconnecting the guiding portions of all of said cylinders to enable liquid ejected by inward moving pistons from the guiding portions of the cylinders on said one side of said machine to flow to the guiding portions of the cylinders on the other side of said machine and move outward the pistons in those cylinders, a source of pressure liquid other than said cylinders, and means for supplying liquid from said source to the guiding portions of said cylinders to initially move said pistons outward into contact with said thrust member, said last named means including a check valve and a resistance valve which open in opposite directions and permit liquid to flow freely from said source to said guiding portions and permit liquid to escape from said guiding portions only after the pressure therein exceeds the pressure at said source.

11. In a hydrodynamic machine, the combination of a rotatable cylinder barrel having a plurality of two-diameter cylinders arranged therein in a circular row, each cylinder including an outer bore and a smaller inner bore, a two-diameter piston arranged in each cylinder and having its larger portion fitted in said outer bore and its smaller portion fitted in said inner bore and forming a shoulder at its junction with said large portion, an annular thrust member arranged eccentric to said cylinder barrel and engaging the outer end of each piston to cause said piston to reciprocate in its cylinder during rotation of said cylinder barrel, a channel communicating with each of said inner bores, valve means for controlling said channels to thereby control the flow of fluid to and from said cylinders, means for connecting said outer bores to each other to enable fluid expelled from the outer bores on one side of the machine by inward moving pistons to flow to the outer bores on the other side of the machine and move outward the pistons therein, a source of pressure fluid other than said cylinders, and means for supplying fluid from said source to said outer bores to act upon said shoulders and initially move said pistons into contact with said thrust member, said last named means including a combination check and resistance valve which permits fluid to flow freely from said source to said outer bores and prevents fluid from escaping therefrom until after the pressure therein exceeds the pressure at said source.

WALTER FERRIS.

REFERENCES CITED

The following references are of record in the file of this patent:

UNITED STATES PATENTS

| Number | Name | Date |
| --- | --- | --- |
| 2,069,651 | Ferris | Feb. 2, 1937 |
| 2,074,068 | Ferris | Mar. 16, 1937 |
| 2,229,715 | Zimmerman | Jan. 28, 1941 |
| 2,273,468 | Ferris | Feb. 17, 1942 |
| 2,292,181 | Tucker | Aug. 4, 1942 |
| 2,304,903 | Eppens | Dec. 15, 1942 |
| 2,345,446 | Baker | Mar. 28, 1942 |
| 2,391,221 | Beeh | Dec. 18, 1945 |
| 2,420,080 | Huck | May 6, 1947 |
| 2,462,931 | Anderson | Mar. 1, 1949 |
| 2,470,220 | Mott | May 17, 1949 |
| 2,484,337 | Ferris | Oct. 11, 1949 |

FOREIGN PATENTS

| Number | Country | Date |
| --- | --- | --- |
| 220,417 | Great Britain | 1924 |